(12) United States Patent
Mori et al.

(10) Patent No.: US 10,512,937 B2
(45) Date of Patent: Dec. 24, 2019

(54) VIBRATION MOTOR

(71) Applicant: Nidec Seimitsu Corporation, Ueda-shi, Nagano-ken (JP)

(72) Inventors: Zendi Mori, Ueda (JP); Mitsuru Murata, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 294 days.

(21) Appl. No.: 15/702,825

(22) Filed: Sep. 13, 2017

(65) Prior Publication Data

US 2018/0071779 A1  Mar. 15, 2018

Related U.S. Application Data

(60) Provisional application No. 62/394,300, filed on Sep. 14, 2016.

(30) Foreign Application Priority Data

Mar. 24, 2017  (JP) .................................. 2017-059299

(51) Int. Cl.
*B06B 1/04* (2006.01)
*H02K 33/00* (2006.01)
(Continued)

(52) U.S. Cl.
CPC ............... *B06B 1/045* (2013.01); *H02K 1/34* (2013.01); *H02K 3/04* (2013.01); *H02K 33/00* (2013.01);
(Continued)

(58) Field of Classification Search
CPC ......... B06B 1/045; H02K 1/34; H02K 33/00; H02K 3/04; H02K 7/065; H02K 7/1876;
(Continued)

(56) References Cited

U.S. PATENT DOCUMENTS 7,525,403 B2 * 4/2009 Kim ....................... B06B 1/045
310/12.22
8,669,679 B2  3/2014 Lee et al.
(Continued)

FOREIGN PATENT DOCUMENTS

JP  2013-085438 A  5/2013

OTHER PUBLICATIONS

Mori et al., "Vibration Motor", U.S. Appl. No. 15/693,589, filed Sep. 1, 2017.
(Continued)

*Primary Examiner* — Jue Zhang
*Assistant Examiner* — Demetries A Gibson
(74) *Attorney, Agent, or Firm* — Keating & Bennett, LLP

(57) ABSTRACT

A vibration motor includes a stationary portion, a vibrating body, an elastic member, and a damper member. The elastic member includes a first extending portion, a second extending portion, a first connection portion, a second connection portion, a third extending portion, a fourth extending portion, a third connection portion, a fourth connection portion, and a fifth connection portion. The damper member includes a first longitudinal portion and a second longitudinal portion. An inner section including the first extending portion, the third extending portion, and the fifth connection portion directly opposes an upper surface of a weight in plan view in an up-down direction.

20 Claims, 18 Drawing Sheets

(51) Int. Cl.
  *H02K 3/04*   (2006.01)
  *H02K 1/34*   (2006.01)
  *H02K 35/00*   (2006.01)
  *H02K 7/065*   (2006.01)
  *H02K 33/06*   (2006.01)
  *H02K 33/04*   (2006.01)
  *H02K 35/02*   (2006.01)
  *H02K 33/02*   (2006.01)
  *H02K 7/18*   (2006.01)

(52) U.S. Cl.
  CPC .......... *H02K 7/065* (2013.01); *H02K 7/1876* (2013.01); *H02K 33/02* (2013.01); *H02K 33/04* (2013.01); *H02K 33/06* (2013.01); *H02K 35/00* (2013.01); *H02K 35/02* (2013.01)

(58) Field of Classification Search
  CPC ........ H02K 33/02; H02K 33/04; H02K 33/06; H02K 35/00; H02K 35/02
  See application file for complete search history.

(56) References Cited

U.S. PATENT DOCUMENTS

| | | | | |
|---|---|---|---|---|
| 8,786,144 | B2 * | 7/2014 | Lee | H02K 33/18 310/25 |
| 8,803,373 | B2 * | 8/2014 | Choi | H02K 33/18 310/25 |
| 8,860,263 | B2 * | 10/2014 | Yoon | H02K 33/16 310/25 |
| 2007/0216235 | A1 * | 9/2007 | Lee | H02K 33/16 310/36 |
| 2011/0006618 | A1 * | 1/2011 | Lee | B06B 1/045 310/25 |
| 2011/0068639 | A1 * | 3/2011 | Choi | H02K 33/16 310/25 |
| 2011/0074229 | A1 * | 3/2011 | Kim | H02K 15/02 310/29 |
| 2011/0101798 | A1 * | 5/2011 | Lee | H02K 33/16 310/29 |

OTHER PUBLICATIONS

Mori et al., "Vibration Motor", U.S. Appl. No. 15/693,573, filed Sep. 1, 2017.

Mori et al., "Vibration Motor", U.S. Appl. No. 15/693,578, filed Sep. 1, 2017.

Viori et al., "Vibration Motor", U.S. Appl. No. 15/704,133, filed Sep. 14, 2017.

* cited by examiner

VIBRATION MOTOR

CROSS REFERENCE TO RELATED APPLICATIONS

This application claims the benefit of priority to U.S. Patent Application No. 62/394,300 filed on Sep. 14, 2016 and Japanese Patent Application No. 2017-059299 filed on Mar. 24, 2017. The entire contents of these applications are hereby incorporated herein by reference.

BACKGROUND OF THE INVENTION

1. Field of the Invention

The present invention relates to a vibration motor.

2. Description of the Related Art

Hitherto, vibration motors have been installed in various devices, such as smartphones. Types of vibration motors include a horizontal-direction linear vibration type and a vertical-direction linear vibration type. Human beings, who are users, tend to feel vertical vibration more than horizontal vibration. An example of an existing vibration motor of the vertical-direction linear vibration type is disclosed in Japanese Unexamined Patent Application Publication No. 2013-85438.

The vibration motor in Japanese Unexamined Patent Application Publication No. 2013-85438 includes a fixing portion, a magnetic field portion, a substrate, a vibrating portion, and an elastic member. The fixing portion includes a case and a bracket. A lower portion of the case is open. The bracket hermetically seals an internal space of the case. The magnetic field portion includes a magnet and a yoke plate. The magnet is fixed to the bracket. The yoke plate is fixed to the magnet. The vibrating portion includes a coil and a mass body. The substrate is fixed to a lower surface of the coil. The elastic member is disposed between the case and the vibrating portion. The coil has an inside diameter that is larger than the outside diameter of the magnet that opposes the coil. Part of the magnet is insertable into a space formed by the coil.

When electric current is passed through the coil via the substrate, a magnetic field that is produced at the coil and a magnetic field that is produced by the magnet interact with each other. This causes the vibrating portion to vibrate in a vertical direction.

In, for example, smartphones and wearable devices in which a vibration motor is installed, in order to perform driving for a long time, large batteries tend to be installed. As a result, there is a limit to where the vibration motor can be disposed and to the volume that can be taken up by the vibration motor. In particular, since dead space in the aforementioned devices corresponds to a rectangular space that is, for example, beside a battery, the vibration motor is required to be disposed in this space.

Therefore, in order to dispose the vibration motor in the aforementioned rectangular space, forming the vibration motor with a rectangular shape instead of a round shape like that in Japanese Unexamined Patent Application Publication No. 2013-85438 may be considered. In this case, a weight of the vibrating body is also rectangular in plan view. However, in such a case, when the vibrating body vibrates in a vertical direction, as shown schematically in FIG. 17, in side view, a vibrating body 200, which includes a weight Wt, may undergo a wavy motion in which a first side end portion and a second side end portion thereof in a long-side direction move oppositely in an up-down direction. In FIG. 17, a double-headed arrow in the up-down direction indicates the direction of vibration of the vibrating body 200, and solid white arrows indicate the wavy motion of the vibrating body 200.

Here, in Japanese Unexamined Patent Application Publication No. 2013-85438, a damping increasing portion is provided in an entire region of the elastic member that supports the vibrating body. Suppressing the aforementioned wavy motion by using the damping increasing portion may be considered. However, when the damping increasing portion is provided in the entire region of the elastic member, the vibration amount of the vibrating body may be reduced. On the other hand, when the damping increasing portion is provided in a region of part of the elastic member, stress that is applied to the damping increasing portion becomes large, as a result of which the damping increasing portion may be weakened, and damping force may be reduced.

SUMMARY OF THE INVENTION

An exemplary embodiment of the present application provides a vibration motor including a stationary portion, a vibrating body, an elastic member, and a damper member. The stationary portion includes a base plate, a substrate, a coil, and a case. The vibrating body includes a magnet, a back yoke, and a weight, and is supported so that the vibrating body is capable of vibrating in an up-down direction with respect to the stationary portion. The substrate is disposed on the base plate. The coil is disposed on the substrate. The magnet is disposed so that the magnet is capable of being accommodated at an inner peripheral side of the coil due to vibration, the coil being ring-shaped. The back yoke is disposed on the magnet. The weight is disposed on the back yoke. The case accommodates the coil, the magnet, the back yoke, and the weight. The elastic member is disposed between the case and the weight. In plan view in the up-down direction, the weight extends in a longitudinal direction orthogonal to the up-down direction. A direction that is orthogonal to the up-down direction and the longitudinal direction is a lateral direction of the weight. The elastic member includes a first extending portion, a second extending portion, a first connection portion, a second connection portion, a third extending portion, a fourth extending portion, a third connection portion, a fourth connection portion, and a fifth connection portion. The first extending portion extends in the longitudinal direction. The second extending portion extends in the longitudinal direction. The first connection portion connects a first end portion of the first extending portion and a first end portion of the second extending portion. The second connection portion connects a second end portion of the first extending portion and a second end portion of the second extending portion. The third extending portion extends in the longitudinal direction and opposes the first extending portion in the lateral direction. The fourth extending portion extends in the longitudinal direction. The third connection portion connects a first end portion of the third extending portion and a first end portion of the fourth extending portion. The fourth connection portion connects a second end portion of the third extending portion and a second end portion of the fourth extending portion. The fifth connection portion connects in the lateral direction an inner portion of the first extending portion in the longitudinal direction and an inner portion of the third extending portion in the longitudinal direction. The first extending portion is inclined upward from an inner side thereof in the longitudinal direction towards both of the end portions thereof. The second extending portion is inclined upward from both of the end portions thereof towards an inner side thereof in the longitudinal direction. The third extending portion is inclined upward from an inner side thereof in the longitudinal direction towards both of the end portions thereof. The fourth extending portion is inclined upward from both of the end portions thereof towards an inner side thereof in the longitudinal direction. The second extending portion includes a first fixing portion at an uppermost portion of an inclination thereof. The fourth extending portion includes a second fixing portion at an uppermost portion of an inclination thereof. The fifth connection portion is fixed to an upper surface of the weight. The first fixing portion and the second fixing portion are fixed to the case. The damper member is fixed to the upper surface of the weight. The damper member includes a first longitudinal portion and a second longitudinal portion. In the plan view in the up-down direction, the first longitudinal portion extends in the longitudinal direction so as to overlap a region that extends from a location at the second extending portion on a first side of the first fixing portion in the longitudinal direction to the first fixing portion and to a location at the second extending portion on a second side of the first fixing portion in the longitudinal direction. In the plan view in the up-down direction, the second longitudinal portion extends in the longitudinal direction so as to overlap a region that extends from a location at the fourth extending portion on a first side of the second fixing portion in the longitudinal direction to the second fixing portion and to a location at the fourth extending portion on a second side of the second fixing portion in the longitudinal direction. An inner section including the first extending portion, the third extending portion, and the fifth connection portion directly opposes the upper surface of the weight in the plan view in the up-down direction.

An exemplary embodiment of the present application provides a vibration motor including a stationary portion, a vibrating body, an elastic member, and a damper member. The stationary portion includes a base plate, a substrate, a coil, and a case. The vibrating body includes a magnet, a back yoke, and a weight, and is supported so that the vibrating body is capable of vibrating in an up-down direction with respect to the stationary portion. The substrate is disposed on the base plate. The coil is disposed on the substrate. The magnet is disposed so that the magnet is capable of being accommodated at an inner peripheral side of the coil due to vibration, the coil being ring-shaped. The back yoke is disposed on the magnet. The weight is disposed on the back yoke. The case accommodates the coil, the magnet, the back yoke, and the weight. The elastic member is disposed between the case and the weight. In plan view in the up-down direction, the weight extends in a longitudinal direction orthogonal to the up-down direction. A direction that is orthogonal to the up-down direction and the longitudinal direction is a lateral direction of the weight. The elastic member includes a first extending portion, a second extending portion, a first connection portion, a second connection portion, a third extending portion, a fourth extending portion, a third connection portion, a fourth connection portion, and a fifth connection portion. The first extending portion extends in the longitudinal direction. The second extending portion extends in the longitudinal direction. The first connection portion connects a first end portion of the first extending portion and a first end portion of the second extending portion. The second connection portion connects a second end portion of the first extending portion and a second end portion of the second extending portion. The third extending portion extends in the longitudinal direction and opposes the first extending portion in the lateral direction. The fourth extending portion extends in the longitudinal direction. The third connection portion connects a first end portion of the third extending portion and a first end portion of the fourth extending portion. The fourth connection portion connects a second end portion of the third extending portion and a second end portion of the fourth extending portion. The fifth connection portion connects in the lateral direction an inner portion of the first extending portion in the longitudinal direction and an inner portion of the third extending portion in the longitudinal direction. The first extending portion is inclined downward from an inner side thereof in the longitudinal direction towards both of the end portions thereof. The second extending portion is inclined downward from both of the end portions thereof towards an inner side thereof in the longitudinal direction. The third extending portion is inclined downward from an inner side thereof in the longitudinal direction towards both of the end portions thereof. The fourth extending portion is inclined downward from both of the end portions thereof towards an inner side thereof in the longitudinal direction. The second extending portion includes a first fixing portion at a lowermost portion of an inclination thereof. The fourth extending portion includes a second fixing portion at a lowermost portion of an inclination thereof. The fifth connection portion is fixed to the case. The first fixing portion and the second fixing portion are fixed to an upper surface of the weight. The damper member is fixed to the case. The damper member includes a first longitudinal portion and a second longitudinal portion. In the plan view in the up-down direction, the first longitudinal portion extends in the longitudinal direction so as to overlap a region that extends from a location at the second extending portion on a first side of the first fixing portion in the longitudinal direction to the first fixing portion and to a location at the second extending portion on a second side of the first fixing portion in the longitudinal direction. In the plan view in the up-down direction, the second longitudinal portion extends in the longitudinal direction so as to overlap a region that extends from a location at the fourth extending portion on a first side of the second fixing portion in the longitudinal direction to the second fixing portion and to a location at the fourth extending portion on a second side of the second fixing portion in the longitudinal direction. An inner section including the first extending portion, the third extending portion, and the fifth connection portion directly opposes the case in the plan view in the up-down direction.

Exemplary embodiments of the present application can provide vibration motors of a vertical-direction linear vibration type that are capable of suppressing weakening of the damper member and suppressing a reduction in the vibration amount of the vibrating body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
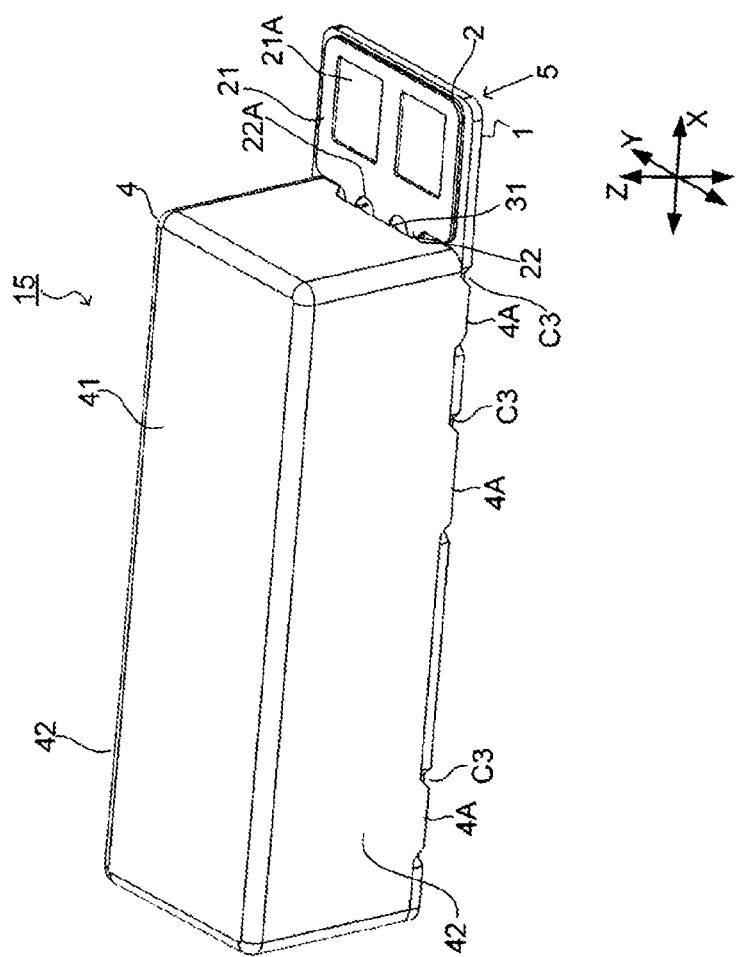
FIG. 1 is an overall perspective view of a vibration motor according to an embodiment of the present invention as seen from thereabove.

An exemplary embodiment according to the present invention is described below with reference to the drawings. In the drawings below, the vibration direction of a vibrating body is an up-down direction and indicated as Z direction. The term "longitudinal direction" that is orthogonal to the up-down direction refers to X direction. The term "lateral direction" that is orthogonal to the up-down direction and the longitudinal direction refers to Y direction. However, these definitions of the directions do not indicate positional relationships and directions when a vibration motor is actually installed in a device.

Figure 2:
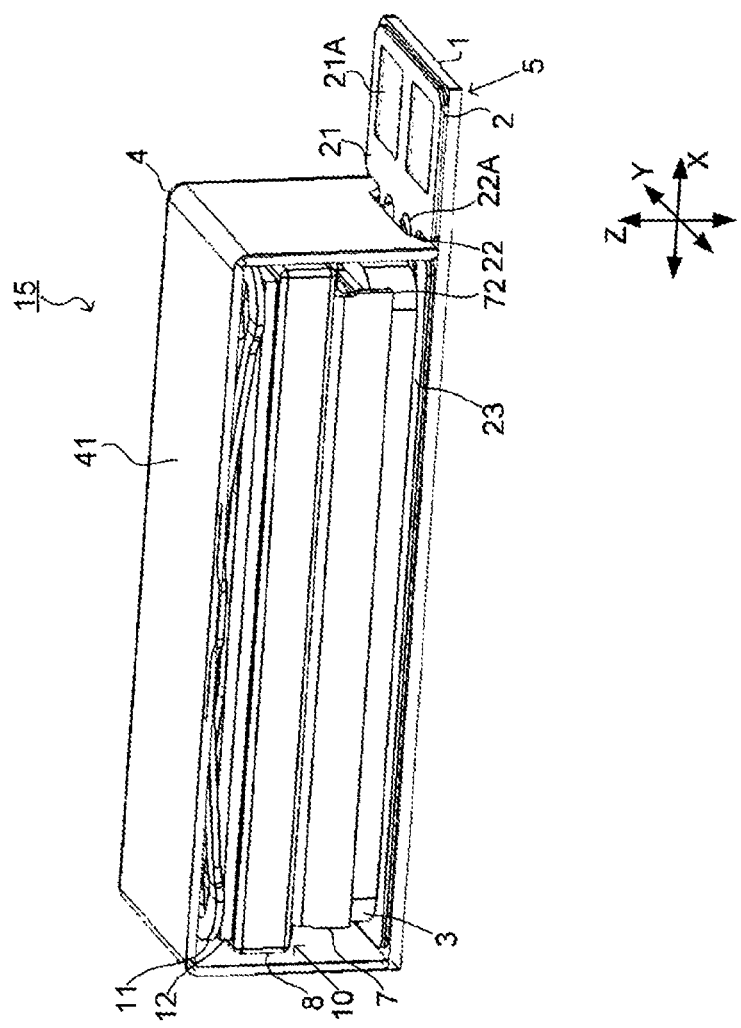
FIG. 2 illustrates the vibration motor in FIG. 1 without a side surface portion of a case in a lateral direction.
Figure 3:
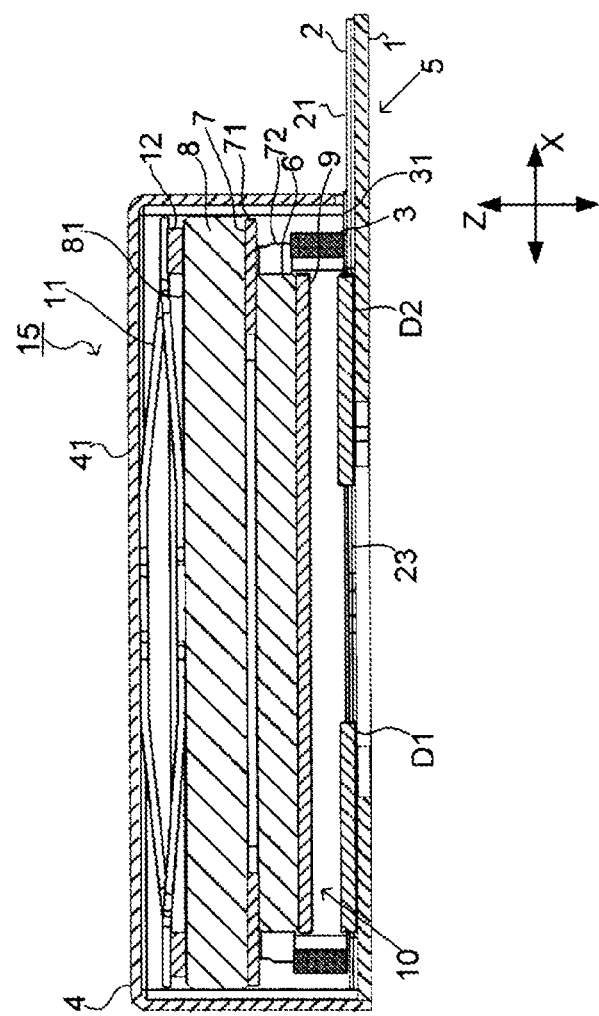
FIG. 3 is a side sectional view of the vibration motor according to the embodiment of the present invention.

First, a basic overall structure of a vibration motor 15 according to an embodiment of the present invention is described by using FIGS. 1 to 3. FIG. 1 is an overall perspective view of the vibration motor 15 according to the embodiment of the present invention as seen from thereabove. FIG. 2 illustrates the vibration motor 15 in FIG. 1 without a side surface portion of a case 4 in the lateral direction, and shows an internal structure of the case 4. FIG. 3 is a side sectional view of the vibration motor 15.

The vibration motor 15 according to the embodiment roughly includes a stationary portion 5, a vibrating body 10, an elastic member 11, and a damper member 12.

The stationary portion 5 includes a base plate 1, a substrate 2, a coil 3, and a case 4. The base plate 1 is, for example, a metallic plate member. The base plate 1 has a rectangular shape having long sides in the longitudinal direction and short sides in the lateral direction in top view.

The substrate 2 is disposed on the base plate 1, and is formed from a flexible printed circuit (FPC). The substrate 2 may be a rigid substrate. The substrate 2 includes a first substrate portion 21, a connection portion 22, and a second substrate portion 23. The first substrate portion 21, the connection portion 22, and the second substrate portion 23 are disposed in that order in the longitudinal direction. The width of the first substrate portion 21 in the longitudinal direction is smaller than the width of the second substrate portion 23 in the longitudinal direction. The widths of the first substrate portion 21 and the second substrate portion 23 in the lateral direction are the same, and are larger than the width of the connection portion 22 in the lateral direction.

Two first terminal portions 21A are formed side by side in the lateral direction at the first substrate portion 21, and have their upper sides exposed. Two second terminal portions 22A are formed side by side in the lateral direction at the connection portion 22, and have their upper sides exposed. Each first terminal portion 21A and its corresponding second terminal portion 22A that are adjacent to each other in the longitudinal direction are electrically connected to each other by a wire of the substrate 2.

The coil 3 is disposed on the second substrate portion 23 of the substrate 2. The coil 3 has a ring shape having long sides in the longitudinal direction and short sides in the lateral direction in top view. A lead wire 31 that is led out from the coil 3 is connected to the second terminal portions 22A. Therefore, by applying a voltage to the first terminal portions 21A from outside the vibration motor 15, it is possible to cause electric current to flow through the coil 3.

The case 4 is a cover member having a rectangular parallelepiped body having long sides in the longitudinal direction and short sides in the lateral direction in top view, with a lower side of the rectangular parallelepiped body being open. The coil 3, the vibrating body 10, the elastic member 11, and the damper member 12 are accommodated in an internal space of the case 4.

The vibrating body 10 includes a magnet 6, a back yoke 7, a weight 8, and a pole piece 9. The magnet 6 is a rectangular parallelepiped member having long sides in the longitudinal direction and short sides in the lateral direction in top view.

The back yoke 7 is disposed on the magnet 6, and is made of a magnetic material. The back yoke 7 includes a top surface portion 71 and two long-side protruding portions 72. The top surface portion 71 has a rectangular shape having long sides in the longitudinal direction and short sides in the lateral direction in top view. The long-side protruding portions 72 protrude downward from respective long-side portions of the top surface portion 72 that oppose each other in the lateral direction.

The weight 8 is disposed on the back yoke 7, and is made of, for example, a tungsten alloy. The weight 8 is a rectangular parallelepiped member having long sides in the longitudinal direction and short sides in the lateral direction in top view.

The pole piece 9 is disposed on a lower surface of the magnet 6, and is a plate member made of a magnetic material. The pole piece 9 has a rectangular shape having long sides in the longitudinal direction and short sides in the lateral direction in top view. The magnet 6, the back yoke 7, and the pole piece 9 form a magnetic path.

A first end side of the elastic member 11 is fixed to a lower surface of a top surface portion 41 of the case 4, and a second end side of the elastic member 11 is fixed to an upper surface 81 of the weight 8. That is, the elastic member 11 is disposed between the case 4 and the weight 8. This causes the vibrating body 10 to be supported so that the vibrating body 10 is capable of vibrating in the up-down direction with respect to the stationary portion 5.

The magnet 6 and the pole piece 9 are accommodated in a space at an inner peripheral side of the coil 3 depending upon their positions when they vibrate. That is, the magnet 6 is disposed so that the magnet 6 is capable of being accommodated at the inner peripheral side of the ring-shaped coil 3 due to the vibration.

By applying a voltage to the first terminal portions 21A of the substrate 2 from outside the vibration motor 15, electric current flows through the coil 3, and a magnetic field produced at the coil 3 and a magnetic field produced by the magnet 6, the back yoke 7, and the pole piece 9 interact each other. This causes the vibrating body 10 to vibrate in the up-down direction. Therefore, the vibration motor 15 is a vertical-direction linear vibration type motor.

As described above, the base plate 1, the case 4, the magnet 6, the back yoke 7, and the weight 8 each have a rectangular shape having long sides in the longitudinal direction and short sides in the lateral direction in top view. Therefore, the vertical-direction linear vibration type vibration motor 15 can be disposed in a rectangular dead space that is, for example, beside a battery in a device, such as a smartphone or a wearable device.

The stationary portion 5 further includes lower damper members D1 and D2, and the structure thereof is described later.

Figure 4:
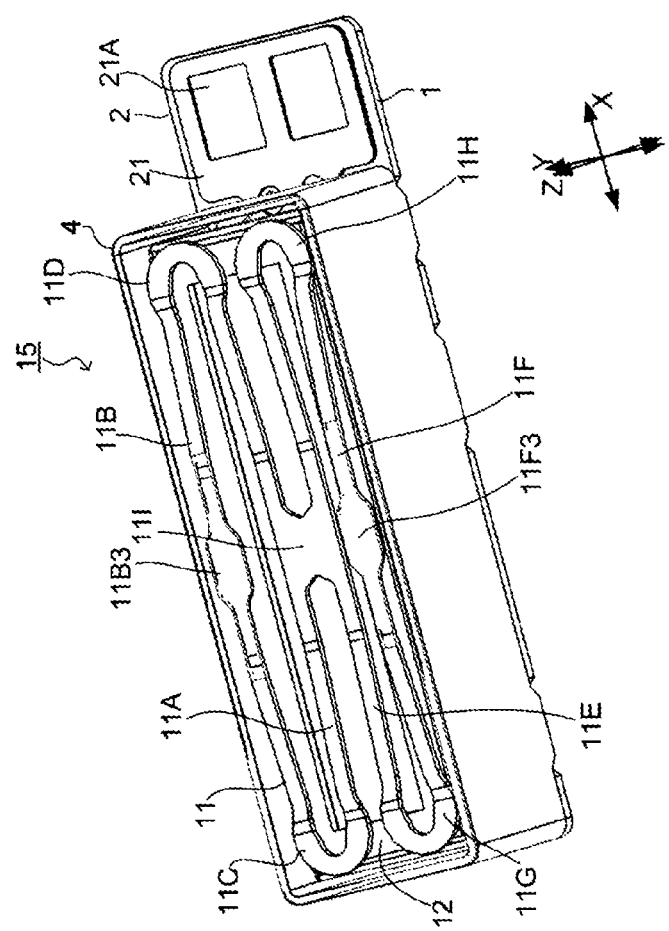
FIG. 4 is a perspective view of the vibration motor without a top surface portion of the case.
Figure 5:
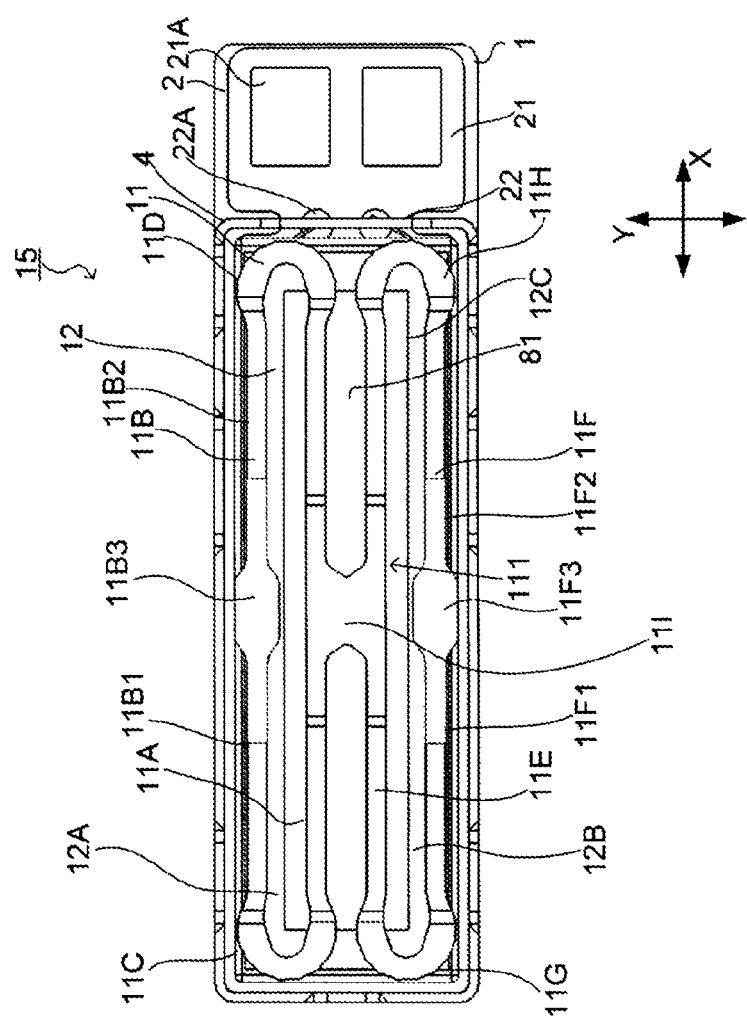
FIG. 5 is a top plan view of the vibration motor in the state in FIG. 4.

Next, a more specific structure of the elastic member 11 is described with reference to, in particular, FIGS. 4 and 5. FIG. 4 is a perspective view of the vibration motor 15 without the top surface portion 41 of the case 4, and shows an internal structure of the case 4. FIG. 5 is a top plan view of the vibration motor 15 in the state in FIG. 4.

As shown in FIGS. 4 and 5, the elastic member 11 includes a first extending portion 11A, a second extending portion 11B, a first connection portion 11C, a second connection portion 11D, a third extending portion 11E, a fourth extending portion 11F, a third connection portion 11G, a fourth connection portion 11H, and a fifth connection portion 11I. These portions are formed into one and the same member.

The first extending portion 11A and the second extending portion 11B extend in the longitudinal direction and are adjacent to each other in the lateral direction in top view. The first connection portion 11C connects a first end portion of the first extending portion 11A and a first end portion of the second extending portion 11B. The second connection portion 11D connects a second end portion of the first extending portion 11A and a second end portion of the second extending portion 11B.

The third extending portion 11E extends in the longitudinal direction and opposes the first extending portion 11A in the lateral direction. The fourth extending portion 11F extends in the longitudinal direction and is adjacent to the third extending portion 11E in the lateral direction in top view. The third connection portion 11G connects a first end portion of the third extending portion 11E and a first end portion of the fourth extending portion 11F. The fourth connection portion 11H connects a second end portion of the third extending portion 11E and a second end portion of the fourth extending portion 11F.

The fifth connection portion 11I connects a central portion of the first extending portion 11A and a central portion of the third extending portion 11E in the lateral direction.

By virtue of such a structure, only one elastic member needs to be used, so that the number of components can be reduced.

Further, in the structure of the elastic member 11, the first extending portion 11A is inclined upward from its central portion towards both of the end portions thereof. The second extending portion 11B includes a first supporting portion 11B1, a second supporting portion 11B2, and a first fixing portion 11B3. The first supporting portion 11B1 is inclined upward from a side of the first connection portion 11C towards the first fixing portion 11B3. The second supporting portion 11B2 is inclined upward from a side of the second connection portion 11D towards the first fixing portion 11B3. The first fixing portion 11B3 is supported by the first supporting portion 11B1 and the second supporting portion 11B2. The term "inclined" above also refers to the case in which a portion becomes level at some intermediate point. This also applies to the descriptions below.

The third extending portion 11E is inclined upward from its central portion towards both of the end portions. The fourth extending portion 11F includes a third supporting portion 11F1, a fourth supporting portion 11F2, and a second fixing portion 11F3. The third supporting portion 11F1 is inclined upward from a side of the third connection portion 11G towards the second fixing portion 11F3. The fourth supporting portion 11F2 is inclined upward from a side of the fourth connection portion 11H towards the second fixing portion 11F3. The third fixing portion 11F3 is supported by the third supporting portion 11F1 and the fourth supporting portion 11F2.

By virtue of such a structure, the fifth connection portion 11I is fixed to the upper surface 81 of the weight 8 by welding, and the first fixing portion 11B3 and the second fixing portion 11F3 that are positioned above the fifth connection portion 11I are fixed to the lower surface of the top surface portion 41 of the case 4 by welding, as a result of which the vibrating body 10 can be supported so that the vibrating body 10 is capable of vibrating with respect to the case 4. The fifth connection portion 11I, the first fixing portion 11B3, and the second fixing portion 11F3 may be fixed by, for example, adhering them with an adhesive instead of by welding them.

Figure 6:
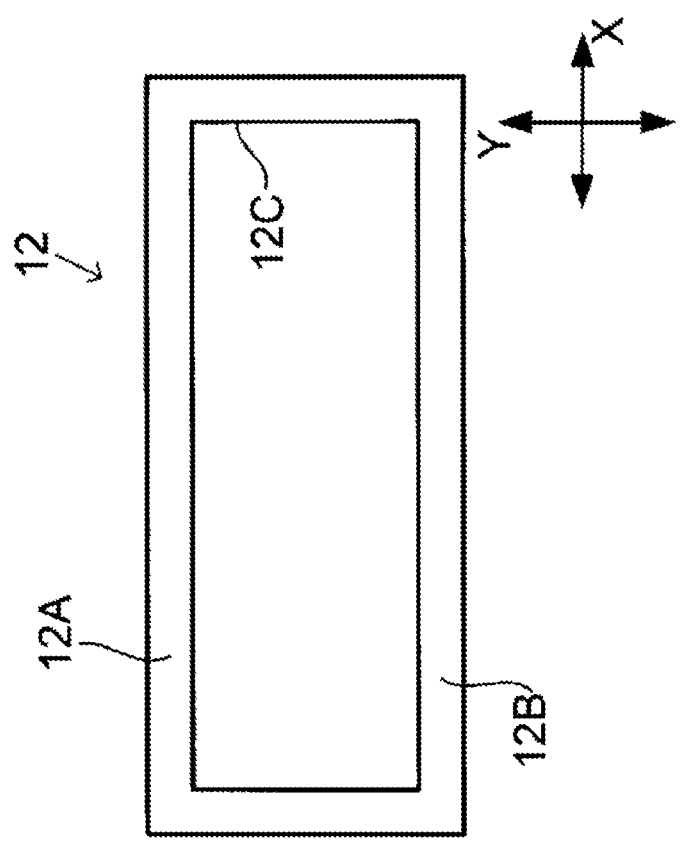
FIG. 6 is a plan view of an exemplary structure of a damper member.

The damper member 12 made of, for example, urethane foam is fixed to the upper surface 81 of the weight 8 by adhering it with an adhesive, and is disposed between the weight 8 and the elastic member 11. FIG. 6 is a top plan view of the damper member 12. As shown in FIG. 6, the damper member has a rectangular ring shape having long sides in the longitudinal direction and short sides in the lateral direction in top view; and is formed from one member. The damper member 12 includes a first longitudinal portion 12A, a second longitudinal portion 12B, and an opening portion 12C, each of which extends in the longitudinal direction.

In top view, the entire first supporting portion 11B1 of the second extending portion 11B that is positioned on a first side of the first fixing portion 11B3 in the longitudinal direction, the entire first fixing portion 11B3 of the second extending portion 11B, and the entire second supporting portion 11B2 of the second extending portion 11B that is positioned on a second side of the first fixing portion 11B3 in the longitudinal direction overlap the first longitudinal portion 12A of the damper member 12. That is, in top view, the first longitudinal portion 12A overlaps the entire second extending portion 11B.

In top view, the entire third supporting portion 11F1 of the fourth extending portion 11F that is positioned on a first side of the second fixing portion 11F3 in the longitudinal direction, the entire second fixing portion 11F3 of the fourth extending portion 11F, and the entire fourth supporting portion 11F2 of the fourth extending portion 11F that is positioned on a second side of the second fixing portion 11F3 in the longitudinal direction overlap the second longitudinal portion 12B of the damper member 12. That is, in top view, the second longitudinal portion 12B overlaps the entire fourth extending portion 11F.

The fifth connection portion 11I is fixed to the upper surface 81 of the weight 8 at an internal portion of the opening portion 12C of the damper member 12. An inner section 111 including the first extending portion 11A, the third extending portion 11E, and the fifth connection portion 11I overlaps the opening portion 12C of the damper member 12 in top view. That is, the inner section 111 directly opposes the upper surface 81 of the weight 8 in the up-down direction without the damper member 12 being interposed therebetween. Here, the term "directly" also refers to the case in which the fifth connection portion 11I is fixed to the weight 8 by, for example, adhering it with an adhesive.

By such a structure, when the vibrating body 10 vibrates, even if the second extending portion 11B and the first longitudinal portion 12A of the damper member 12, which move more easily than the inner section 111, contact each other; and even if the fourth extending portion 11F and the second longitudinal portion 12B of the damper member 12, which move more easily than the inner section 111, contact each other, stress that acts upon the damper member from the elastic member 11 is distributed. Therefore, the weakening of the damper member 12 can be suppressed. In addition, when the vibrating body 10 vibrates, the inner section 111 does not contact the damper member 12, so that a reduction in the vibration amount of the vibrating body 10 can be suppressed.

Since in top view the first longitudinal portion 12A overlaps the entire second extending portion 11B, and the second longitudinal portion 12B overlaps the entire fourth extending portion 11F, when the vibrating body 10 vibrates, a wavy motion of the weight 8 can be suppressed. Part of the first supporting portion 11B1, the entire first fixing portion 11B3, and part of the second supporting portion 11B2 may overlap the first longitudinal portion 12A; and part of the third supporting portion 11F1, the entire second fixing portion 11F3, and part of the fourth supporting portion 11F2 may overlap the second longitudinal portion 12B.

Figure 7:
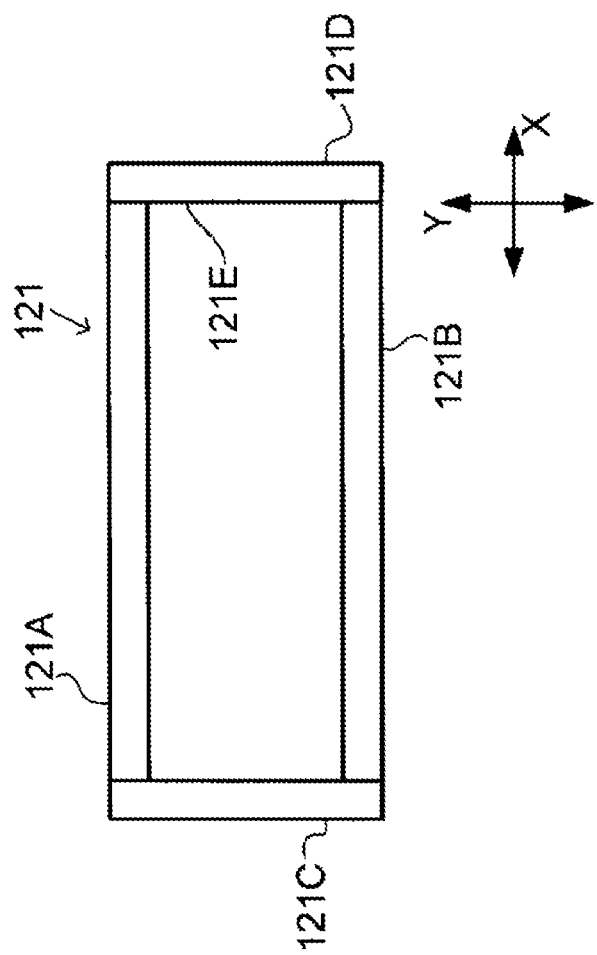
FIG. 7 is a plan view of an exemplary structure of a damper member.

The damper member is not limited to one formed from one member as with the damper member 12 shown in FIG. 6. The damper member may have a structure like that of, for example, a damper member 121 shown in FIG. 7. That is, the ring-shaped damper member 121 includes a combination of a first longitudinal portion 121A, a second longitudinal portion 121B, a first lateral portion 121C, and a second lateral portion 121D, which are separate members. These separate members form an opening portion 121E that is surrounded by the separate members from four sides. However, the damper member 12 shown in FIG. 6 provides the effect of reducing the number of steps because it does not need to be assembled.

Figure 8A:
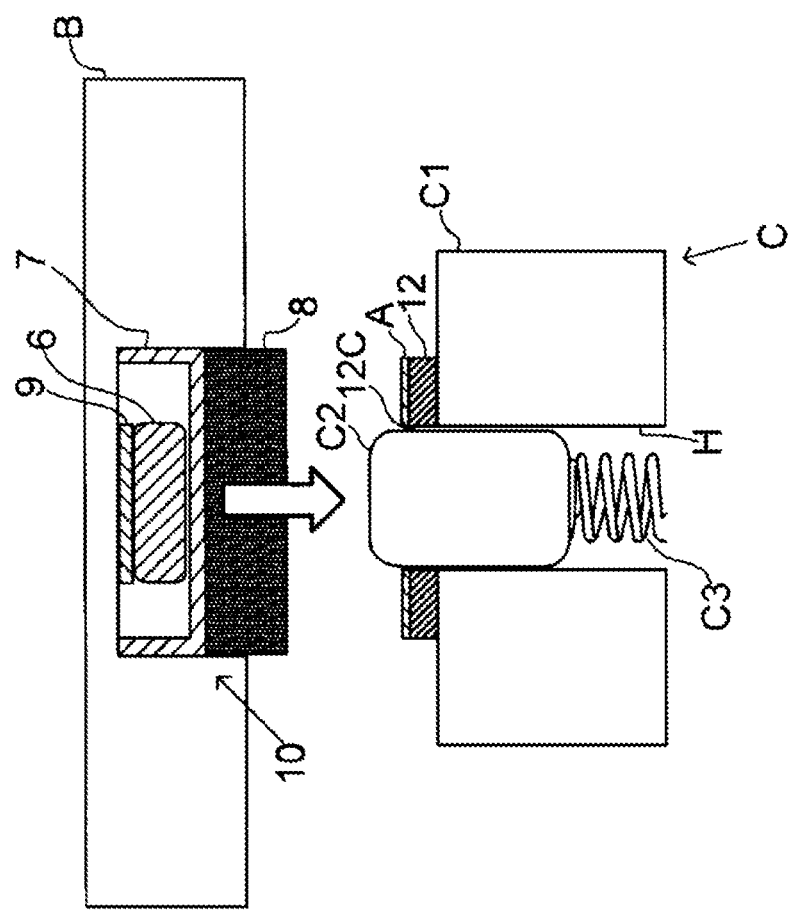
FIG. 8A is a schematic sectional view showing a method of fixing the damper member to a vibrating body.

Here, the step of fixing the damper member 12 to the vibrating body 10 in manufacturing the vibration motor 15 is described. FIG. 8A is a schematic sectional view showing a method of fixing the damper member 12 to the vibrating body 10 by using a first jig B and a second jig C.

The second jig C includes a base portion C1, a pin C2, and a spring C3. The pin C2 is supported by a spring C3 that is movable in the up-down direction in a hole portion H of the base portion C1. When the spring C3 is in its natural state, a top portion of the pin C2 protrudes above the hole portion H.

As shown in FIG. 8A, the vibrating body 10 formed by assembling the weight 8, the back yoke 7, the magnet 6, and the pole piece 9 is held by the first jig B. On the other hand, the opening portion 12C of the damper member 12 is made to receive the protruding portion of the pin C2, and the damper member 12 is placed on the base portion C1. An adhesion portion A is formed on a surface of the damper member 12 on a side opposite to the base portion C1.

Figure 8B:
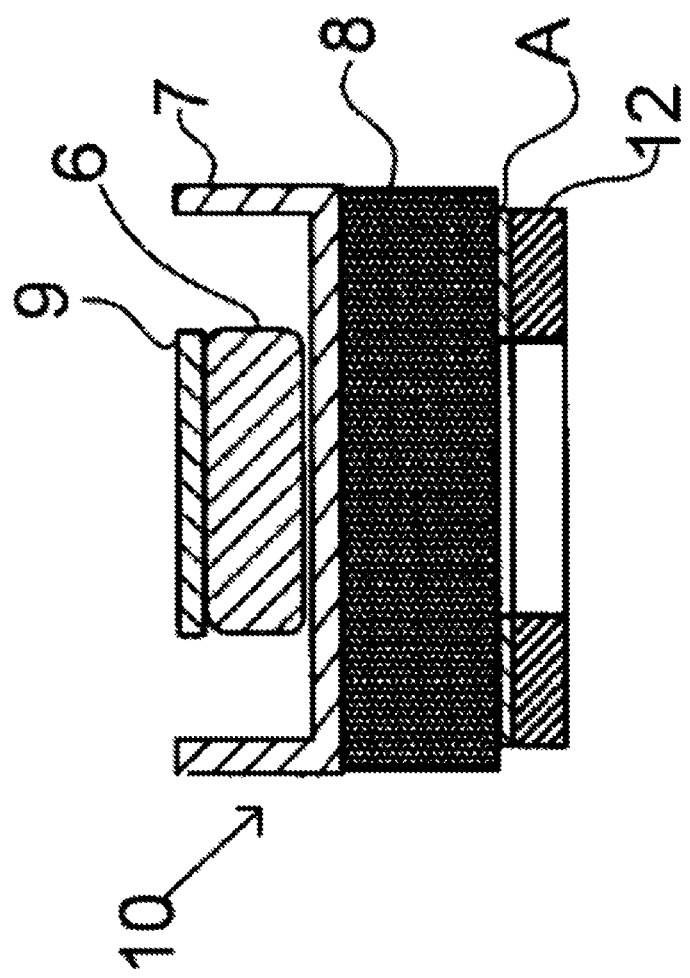
FIG. 8B is a sectional view of a component in which the damper member is fixed to the vibrating body.

As indicated by the arrow in FIG. 8A, the first jig B is moved downward to bring the weight 8 closer to the pin C2. Then, even if the weight 8 comes into contact with an upper surface of the pin C2, the first jig B is moved downward to push the pin C2 downward by the weight 8. While the pin C2 is being pushed downward against an elastic force of the spring C3, the damper member 12 is in a state in which it is positioned by the pin C2. Then, a lower surface of the weight 8 comes into contact with and pushes the adhesion portion A, so that the weight 8 is fixed to the damper member 12 by the adhesion portion A. This causes a component, such as that shown in FIG. 8B, in which the damper member 12 is fixed to the vibrating body 10 to be completed.

Accordingly, the damper member 12 has a ring shape, and the opening portion 12C receives the pin C2, so that the damper member 12 can be easily positioned, and the vibrating body 10 can be fixed to the damper member 12 with the damper member 12 positioned. Since the damper member 121 (FIG. 7) described above also has a ring shape, the same fixing method as that described above is applicable.

Accordingly, the vibration motor 15 according to the embodiment includes the stationary portion 5 including the base plate 1, the substrate 2, the coil 3, and the case 4; the vibrating body 10 that includes the magnet 6, the back yoke 7, and the weight 8 and that is supported so that it is capable of vibrating in the up-down direction with respect to the stationary portion 5; the elastic member 11; and the damper member 12.

The substrate 2 is disposed on the base plate 1. The coil 3 is disposed on the substrate 2. The magnet 6 is disposed so that the magnet 6 is capable of being accommodated at the inner peripheral side of the ring-shaped coil 3 due to vibration. The back yoke 7 is disposed on the magnet 6. The weight 8 is disposed on the back yoke 7. The case 4 accommodates the coil 3, the magnet 6, the back yoke 7, and the weight 8. The elastic member 11 is disposed between the case 4 and the weight 8. In plan view in the up-down direction, the weight 8 extends in the longitudinal direction orthogonal to the up-down direction; and a direction orthogonal to the up-down direction and the longitudinal direction is the lateral direction of the weight 8.

The elastic member 11 includes the first extending portion 11A that extends in the longitudinal direction, the second extending portion 11B that extends in the longitudinal direction, the first connection portion 11C that connects the first end portion of the first extending portion 11A and the first end portion of the second extending portion 11B, the second connection portion 11D that connects the second end portion of the first extending portion 11A and the second end portion of the second extending portion 11B, the third extending portion 11E that extends in the longitudinal direction and that opposes the first extending portion 11A in the lateral direction, the fourth extending portion 11F that extends in the longitudinal direction, the third connection portion 11G that connects the first end portion of the third extending portion 11E and the first end portion of the fourth extending portion 11F, the fourth connection portion 11H that connects the second end portion of the third extending portion 11E and the second end portion of the fourth extending portion 11F, and the fifth connection portion 11I that connects in the lateral direction an inner portion of the first extending portion 11A in the longitudinal direction and an inner portion of the third extending portion 11E in the longitudinal direction.

The first extending portion 11A is inclined upward from its inner side in the longitudinal direction towards both of the end portions thereof. The second extending portion 11B is inclined upward from both of the end portions thereof towards its inner side in the longitudinal direction. The third extending portion 11E is inclined upward from its inner side in the longitudinal direction towards both of the end portions thereof. The fourth extending portion 11F is inclined upward from both of the end portions thereof towards its inner side in the longitudinal direction.

The second extending portion 11B includes the first fixing portion 11B3 at an uppermost portion of the inclination thereof. The fourth extending portion 11F includes the second fixing portion 11F3 at an uppermost portion of the inclination thereof. The fifth connection portion 11I is fixed to the upper surface 81 of the weight 8. The first fixing portion 11B3 and the second fixing portion 11F3 are fixed to the case 4.

The damper member 12 is fixed to the upper surface 81 of the weight 8. The damper member 12 includes the first longitudinal portion 12A and the second longitudinal portion 12B. In plan view in the up-down direction, the first longitudinal portion 12A extends in the longitudinal direction so as to overlap a region that extends from a location at the second extending portion 11B on the first side of the first fixing portion 11B3 in the longitudinal direction to the first fixing portion 11B3 and to a location at the second extending portion 11B on the second side of the first fixing portion 11B3 in the longitudinal direction. In plan view in the up-down direction, the second longitudinal portion 12B extends in the longitudinal direction so as to overlap a region that extends from a location at the fourth extending portion 11F on the first side of the second fixing portion 11F3 in the longitudinal direction to the second fixing portion 11F3 and to a location at the fourth extending portion 11F on the second side of the second fixing portion 11F3 in the longitudinal direction. The inner section 111 including the first extending portion 11A, the third extending portion 11E, and the fifth connection portion 11I directly opposes the upper surface 81 of the weight 8 in plan view in the up-down direction.

According to such a structure, when the vibrating body vibrates, even if the second extending portion and the fourth extending portion, which move more easily than the inner section, contact the damper member, stress that acts upon the damper member from the elastic member is distributed. Therefore, the weakening of the damper member can be suppressed. In addition, when the vibrating body vibrates, the inner section does not contact the damper member, so that a reduction in the vibration amount of the vibrating body can be suppressed.

In the above-described structure, in plan view in the up-down direction, the first longitudinal portion 12A overlaps the entire second extending portion 11B; and, in plan view in the up-down direction, the second longitudinal portion 12B overlaps the entire fourth extending portion 11F. This makes it possible to suppress a wavy motion of the weight.

In the above-described structure, the damper member 12 has a ring shape. This makes it easier to position the damper member by a jig, and to mount the damper member.

In the above-described structure, the damper member 12 is formed from one member. This makes it unnecessary to assemble the damper member itself.

The widths of the first connection portion 11C, the second connection portion 11D, the third connection portion 11G, and the fourth connection portion 11H are larger than the widths of the first extending portion 11A, the second extending portion 11B, the third extending portion 11E, and the fourth extending portion 11F. This makes it possible to distribute the stress applied to the elastic member when the vibrating body vibrates.

Figure 9:
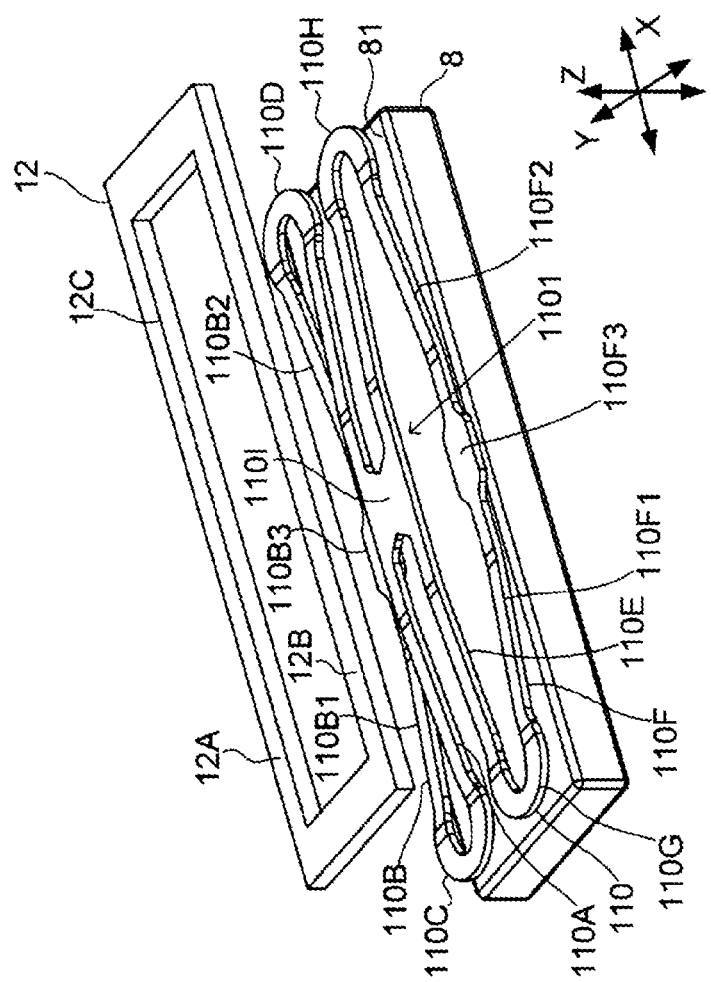
FIG. 9 is a perspective view of a structure of part of a vibration motor according to a modification including an elastic member and a damper member.

In the embodiment, the elastic member and the damper may have the following structures. FIG. 9 is a perspective view of a structure of part of a vibration motor according to a modification including an elastic member 110 and a damper member 12.

In the structure according to the modification shown in FIG. 9, the elastic member 110 is disposed between the weight 8 and the case 4 (not shown), and the damper member 12 is disposed between the case 4 and the elastic member 110.

The elastic member 110 includes a first extending portion 110A, a second extending portion 110B, a first connection portion 110C, a second connection portion 110D, a third extending portion 110E, a fourth extending portion 110F, a third connection portion 110G, a fourth connection portion 110H, and a fifth connection portion 110I. These portions are formed into one and the same member.

The first extending portion 110A and the second extending portion 110B extend in the longitudinal direction, and are adjacent to each other in the lateral direction in top view. The first connection portion 110C connects a first end portion of the first extending portion 110A and a first end portion of the second extending portion 110B. The second connection portion 110D connects a second end portion of the first extending portion 110A and a second end portion of the second extending portion 110B.

The third extending portion 110E extends in the longitudinal direction, and opposes the first extending portion 110A in the lateral direction. The fourth extending portion 110F extends in the longitudinal direction, and is adjacent to the third extending portion 110E in the lateral direction in top view. The third connection portion 110G connects a first end portion of the third extending portion 110E and a first end portion of the fourth extending portion 110F. The fourth connection portion 110H connects a second end portion of the third extending portion 110E and a second end portion of the fourth extending portion 110F.

The fifth connection portion 110I connects a central portion of the first extending portion 110A and a central portion of the third extending portion 110E in the lateral direction.

The first extending portion 110A is inclined downward from its central portion towards both of the end portions thereof. The second extending portion 110B includes a first supporting portion 110B1, a second supporting portion 110B2, and a first fixing portion 110B3. The first supporting portion 110B1 is inclined downward from a side of the first connection portion 110C towards the first fixing portion 110B3. The second supporting portion 110B2 is inclined downward from a side of the second connection portion 110D towards the first fixing portion 110B3. The first fixing portion 110B3 is supported by the first supporting portion 110B1 and the second supporting portion 110B2.

The third extending portion 110E is inclined downward from its central portion towards both ends thereof. The fourth extending portion 110F includes a third supporting portion 110F1, a fourth supporting portion 110F2, and a second fixing portion 110F3. The third supporting portion 110F1 is inclined downward from a side of the third connection portion 110G towards the second fixing portion 110F3. The fourth supporting portion 110F2 is inclined downward from a side of the fourth connection portion 110H towards the second fixing portion 110F3. The third fixing portion 110F3 is supported by the third supporting portion 110F1 and the fourth supporting portion 110F2.

By virtue of such a structure, the fifth connection portion 110I is fixed to a lower surface of the top surface portion 41 of the case 4 by, for example, welding, and the first fixing portion 110B3 and the second fixing portion 110F3 that are positioned below the fifth connection portion 110I are fixed to the upper surface 81 of the weight 8 by, for example, welding, as a result of which the vibrating body can be supported so that the vibrating body is capable of vibrating with respect to the case 4.

The damper member 12 is fixed to the lower surface of the top surface portion 41 of the case 4 by adhering the damper member 12 with an adhesive, and is disposed between the case 4 and the elastic member 110.

In top view, the entire first supporting portion 110B1 of the second extending portion 110B that is positioned on a first side of the first fixing portion 110B3 in the longitudinal direction, the entire first fixing portion 110B3 of the second extending portion 110B, and the entire second supporting portion 110B2 of the second extending portion 110B that is positioned on a second side of the first fixing portion 110B3 in the longitudinal direction overlap the first longitudinal portion 12A of the damper member 12. That is, in top view, the first longitudinal portion 12A overlaps the entire second extending portion 110B.

In top view, the entire third supporting portion 110F1 of the fourth extending portion 110F that is positioned on a first side of the second fixing portion 110F3 in the longitudinal direction, the entire second fixing portion 110F3 of the fourth extending portion 110F, and the entire fourth supporting portion 110F2 of the fourth extending portion 110F that is positioned on a second side of the second fixing portion 110F3 in the longitudinal direction overlap the second longitudinal portion 12B of the damper member 12. That is, in top view, the second longitudinal portion 12B overlaps the entire fourth extending portion 110F.

The fifth connection portion 110I is fixed to the lower surface of the top surface portion 41 of the case 4 at the internal portion of the opening portion 12C of the damper member 12. An inner section 110I including the first extending portion 110A, the third extending portion 110E, and the fifth connection portion 110I overlaps the opening portion 12C of the damper member 12 in top view. That is, the inner section 110I directly opposes the lower surface of the top surface portion 41 of the case 4 in the up-down direction without the damper member 12 being interposed therebetween.

By such a structure, when the vibrating body vibrates, even if the second extending portion 110B and the first longitudinal portion 12A of the damper member 12, which move more easily than the inner section 110I, contact each other; and even if the fourth extending portion 110F and the second longitudinal portion 12B of the damper member 12, which move more easily than the inner section 110I, contact each other, stress that acts upon the damper member 12 from the elastic member 110 is distributed. Therefore, the weakening of the damper member 12 can be suppressed. In addition, when the vibrating body vibrates, the inner section 110I does not contact the damper member 12, so that a reduction in the vibration amount of the vibrating body can be suppressed.

Accordingly, the vibration motor according to a different form of the embodiment differs from the embodiment described above in the following structural features. The first extending portion 110A is inclined downward from its inner side in the longitudinal direction to both of the end portions thereof. The second extending portion 110B is inclined downward from both of the end portions thereof towards its inner side in the longitudinal direction. The third extending portion 110E is inclined downward from its inner side in the longitudinal direction towards both of the end portions thereof. The fourth extending portion 110F is inclined downward from both of the end portions thereof towards its inner side in the longitudinal direction. The second extending portion 110B includes the first fixing portion 110B3 at a lowermost portion of the inclination thereof. The fourth extending portion 110F includes the second fixing portion 110F3 at a lowermost portion of the inclination thereof.

The fifth connection portion 110I is fixed to the case 4. The first fixing portion 110B3 and the second fixing portion 110F3 are fixed to the upper surface 81 of the weight 8. The damper member 12 is fixed to the case 4.

The damper member 12 includes the first longitudinal portion 12A and the second longitudinal portion 12B. In plan view in the up-down direction, the first longitudinal portion 12A extends in the longitudinal direction so as to overlap a region that extends from a location at the second extending portion 110B on the first side of the first fixing portion 110B3 in the longitudinal direction to the first fixing portion 110B3 and to a location at the second extending portion 110B on the second side of the first fixing portion 110B3 in the longitudinal direction. In plan view in the up-down direction, the second longitudinal portion 12B extends in the longitudinal direction so as to overlap a region that extends from a location at the fourth extending portion 110F on the first side of the second fixing portion 110F3 in the longitudinal direction to the second fixing portion 110F3 and to a location at the fourth extending portion 110F on the second side of the second fixing portion 110F3 in the longitudinal direction. The inner section 110I including the first extending portion 110A, the third extending portion 110E, and the fifth connection portion 110I directly opposes the case 4 in plan view in the up-down direction.

According to such a structure, when the vibrating body vibrates, even if the second extending portion and the fourth extending portion, which move more easily than the inner section, contact the damper member, stress that acts upon the damper member from the elastic member is distributed. Therefore, the weakening of the damper member can be suppressed. In addition, when the vibrating body vibrates, the inner section does not contact the damper member, so that a reduction in the vibration amount of the vibrating body can be suppressed.

Figure 10:
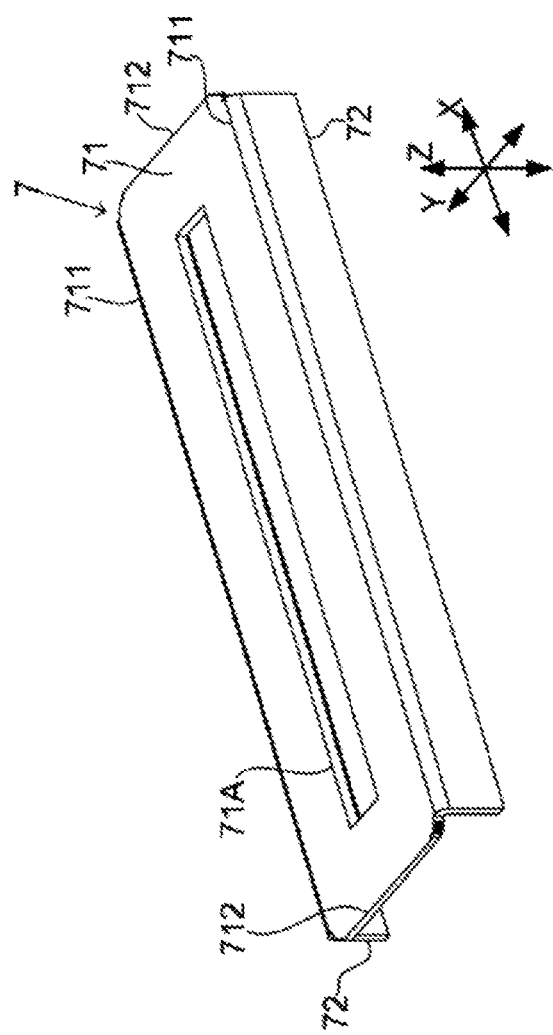
FIG. 10 is an overall perspective view of a back yoke.

Next, a structure of the back yoke 7 is described. FIG. 10 is an overall perspective view of the back yoke 7.

As shown in FIG. 10, the back yoke 7 includes the rectangular top surface portion 71 and two long-side protruding portions 72. These portions are formed into one and the same member. The long-side protruding portions 72 protrude downward from respective long-side portions 711 of the top surface portion 71. Protruding portions that protrude downward from respective short-side portions 712 of the top surface portion 71 are not provided.

That is, the back yoke 7 includes the rectangular top surface portion 71 including the long-side portions 711 in the longitudinal direction and the short-side portions 712 in the lateral direction, and the long-side protruding portions 72 that protrude downward from the respective long-side portions 711 of the top surface portion 71. The back yoke 7 does not include short-side protrusions that protrude downward from the respective short-side portions 712 of the top surface portion 71.

Therefore, even if the vibrating body 10 undergoes a wavy motion when the vibrating body 10 vibrates, since the back yoke 7 does not include short-side protruding portions, the back yoke 7 is prevented from contacting outer peripheral surfaces of end portions of the coil 3 in the longitudinal direction. As shown in FIG. 3, the lead wire 31 of the coil 3 is positioned below one of the short-side portions 712 of the top surface portion 71. However, since the short-side portions 712 do not include short-side protruding portions, it is possible to prevent the back yoke 7 from contacting the lead wire 31.

The back yoke 7 and the magnet 6 form a magnetic path. The long-side protruding portions 72 contribute more to the formation of the magnetic path than short-side protruding portions if they are provided. Therefore, there is no problem even if short-side protruding portions are not provided.

Figure 11:
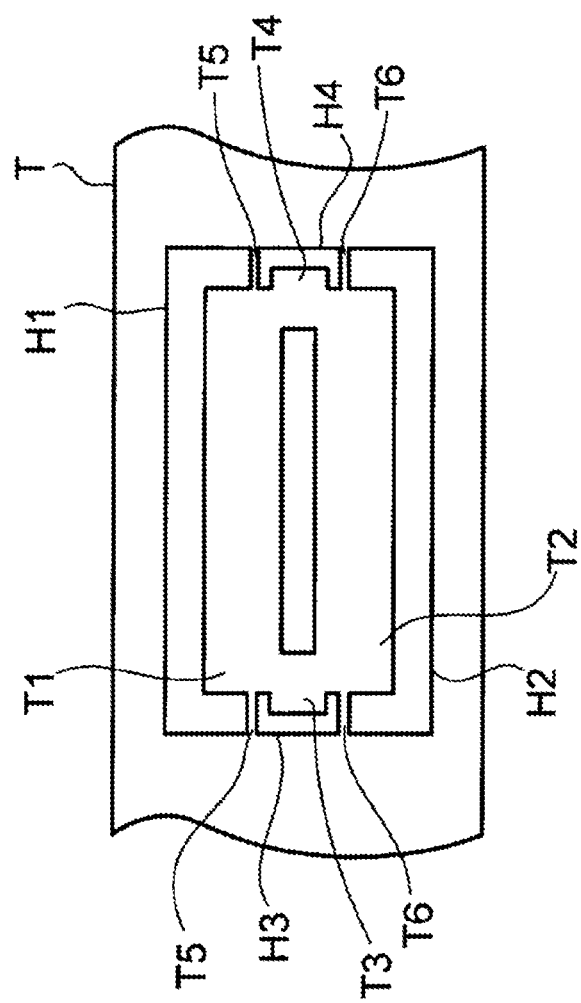
FIG. 11 schematically illustrates a processing state in a die (metallic plate) when manufacturing a back yoke according to a comparative example.

When the back yoke 7 has this structure, manufacturing effects are also provided. FIG. 11 schematically illustrates a processing state in a die T (metallic plate) when manufacturing a back yoke including long-side protruding portions and short-side protruding portions. In this case, holes H1 and H2 for forming the long-side protruding portions and holes H3 and H4 for forming the short-side protruding portions are formed in the die T. The long-side protruding portions can be formed by bending a long-side region T1 surrounded by the hole H1 and a long-side region T2 surrounded by the hole H2. The short-side protruding portions can be formed by bending a short-side region T3 surrounded by the hole H3 and a short-side region T4 surrounded by the hole H4.

At this time, by a supporting portion T5 that is positioned between the holes H1 and H3 and a supporting portion T5 that is positioned between the holes H1 and H4 and a supporting portion T6 that is positioned between the holes H2 and H3 and a supporting portion T6 that is positioned between the holes H2 and H4, a portion that becomes a product is supported at the die T. By cutting the supporting portions T5 and T6, the back yoke, which is the product, can be removed from the die T. However, since portions of the supporting portions T5 and T6 are small, for example, the regions may be accidentally cut during, for example, the bending operation. This may lead to manufacturing problems.

Figure 12:
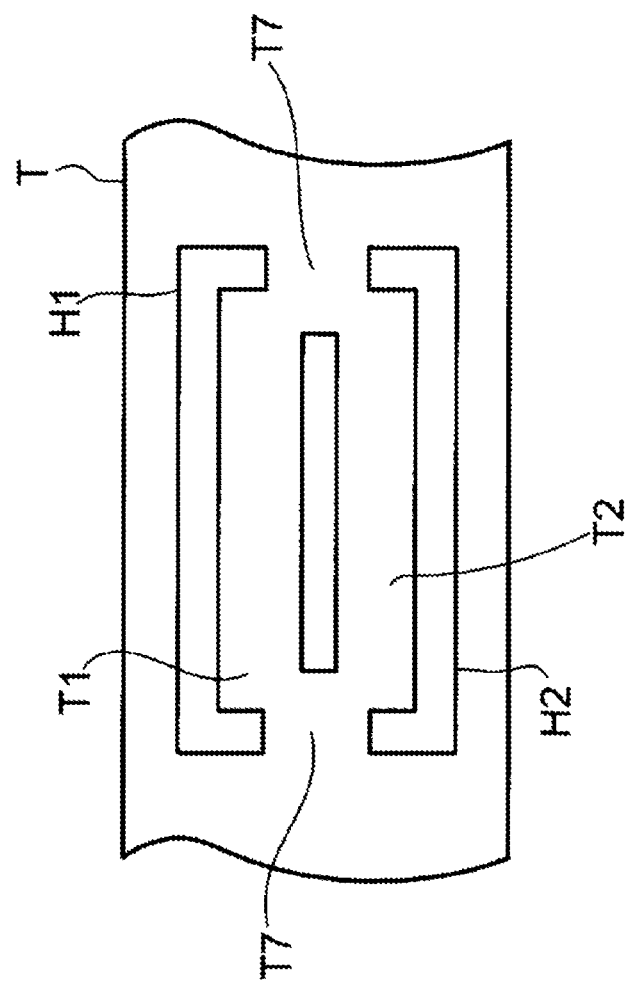
FIG. 12 schematically illustrates a processing state in a die when manufacturing the back yoke according to the embodiment.

In contrast, FIG. 12 schematically illustrates a processing state in a die T when manufacturing a back yoke that does not include short-side protruding portions as in the embodiment. In this case, holes H1 and H2 for forming long-side protruding portions are formed in the die T. The long-side protruding portions can be formed by bending a long-side region T1 surrounded by the hole H1 and a long-side region T2 surrounded by the hole H2. In this state, by supporting portions T7 that are positioned between the holes H1 and H2, a portion that becomes a product is supported at the die T. By cutting the supporting portions T7, the back yoke, which is the product, can be removed from the die T. Since the supporting portions T7 are less likely to be cut than the supporting portions T5 and T6 in FIG. 11, it is possible to increase processing stability.

The top surface portion 71 of the back yoke 7 has a through hole 71A (FIG. 10) that extends therethrough in the up-down direction. In top view, the through hole 71A overlaps an upper surface of the magnet 6. That is, a surface of the back yoke 7 to which the magnet 6 is fixed has the through hole 71A that extends therethrough in the up-down direction.

Therefore, when, with the magnet 6 fixed to the top surface portion 71 by magnetic force, an adhesive is made to flow into the through hole 71A and the magnet 6 is fixed to the top surface portion 71, protrusion of the adhesive to the outer side of the magnet 6 can be suppressed.

Even in a method of fixing the magnet 6 to the top surface portion 71 by bringing the magnet 6 and the top surface portion 71 into contact with each other with an adhesive previously applied to a region along a periphery of the through hole 71A or to a surface of the magnet 6 corresponding to the region along the periphery of the through hole 71A, part of the adhesive is made to flow into the through hole 71A. Therefore, protrusion of the adhesive to the outer side of the magnet 6 can be suppressed. That is, the adhesive can escape into the through hole 71A.

In addition, for example, as with the magnet 6, even in a method of fixing the weight 8 to the top surface portion 71 by bringing the weight 8 and the top surface portion 71 into contact with each other with an adhesive previously applied to a region along a periphery of the through hole 71A or to a surface of the weight 8 corresponding to the region along the periphery of the through hole 71A, part of the adhesive is made to escape into the through hole 71A. Therefore, protrusion of the adhesive to the outer side of the weight 8 can be suppressed.

Structure of Substrate

Figure 13:
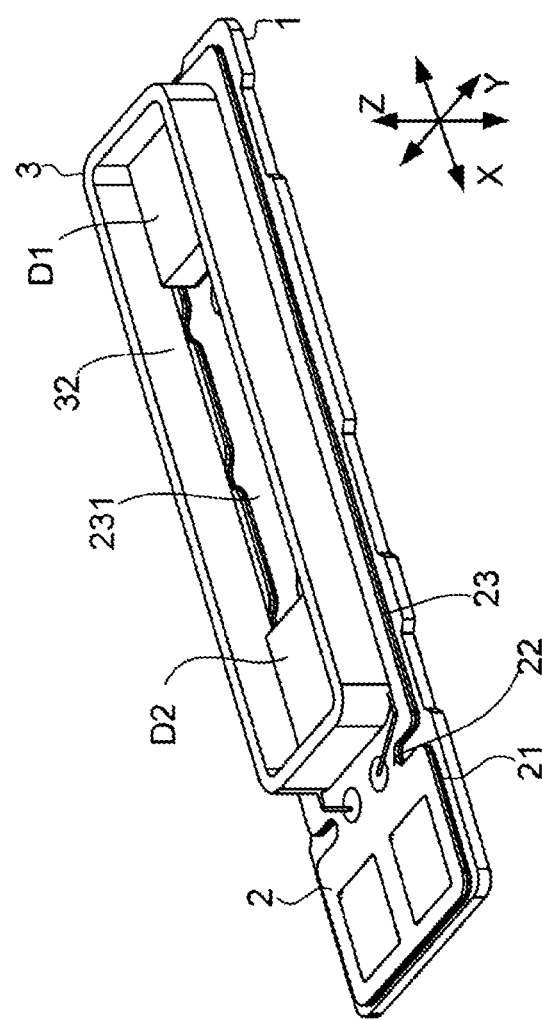
FIG. 13 is a perspective view of a structure in which a substrate and a coil are disposed with respect to a base plate.
Figure 14:
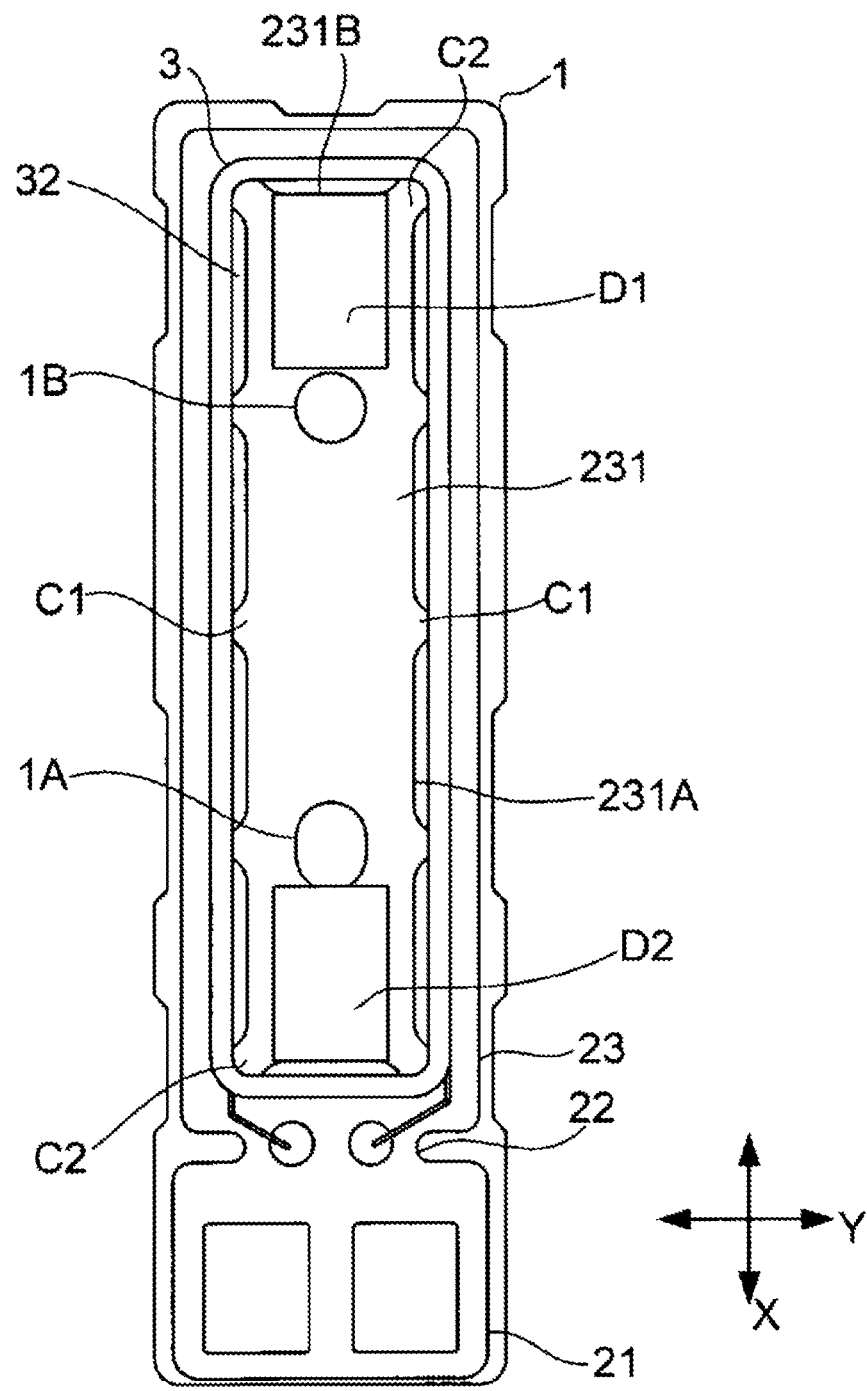
FIG. 14 is a plan view of the structure as seen from above FIG. 13.

Next, a more specific structure of the substrate 2 is described. FIG. 13 is a perspective view of a structure in which the substrate 2 and the coil 3 are disposed with respect to the base plate 1 in the vibration motor 15. FIG. 14 is a plan view of the structure as seen from above FIG. 13.

The coil 3 includes an internal space 32 at an inner peripheral side thereof. The second substrate portion 23 of the substrate 2 has a through region 231 that extends therethrough in the up-down direction. Edge portions of the through region 231 include long-side edge portions 231A opposing each other in the lateral direction and short-side edge portions 231B that oppose each other in the longitudinal direction. Each long-side edge portion 231A has three cutout portions C1 that are recessed towards an outer periphery thereof. Further, cutout portions C2 that are recessed towards the outer periphery are formed at four corners defined by the edge portions of the through region 231, that is, at the locations where the long-side edge portions 231A and the short-side edge portions 231B are adjacent to each other. The edges of the internal space 32 of the coil 3 are positioned above the cutout portions C1 and C2.

That is, the substrate 2 includes the through region 231 that extends therethrough in the up-down direction at the inner peripheral side of the coil 3, and includes the plurality of cutout portions C1 and C2 at the edge portions of the through region 231.

In fixing the coil 3 to the base plate 1, an adhesive is applied to each of the cutout portions C1 and C2. By pushing the coil 3 against the second substrate portion 23 from above the cutout portions C1 and C2, the coil 3 can be fixed to the base plate 1 while interposing the second substrate portion 23 between the coil 3 and the base plate 1. Therefore, it is possible to suppress peeling of the substrate 2 from the base plate 1.

Figure 15:
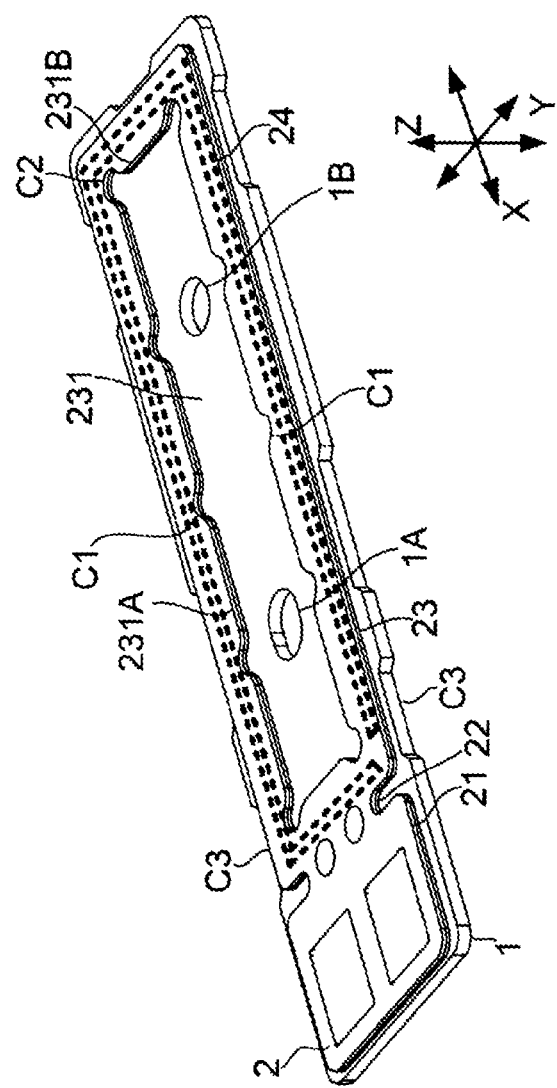
FIG. 15 is a perspective view of a structure in which the substrate is disposed with respect to the base plate.

FIG. 15 is a perspective view of a structure in which the substrate 2 is disposed with respect to the base plate 1.

In the second substrate portion 23, a closed circuit pattern 24 is provided along a periphery of the through region 231. The closed circuit pattern 24 is a closed wire pattern (such as a copper foil pattern), and does not pass electric current therethrough. Although, in FIG. 15, the closed circuit pattern 24 is formed in the substrate 2, the closed circuit pattern 24 may be exposed at an upper surface of the substrate 2. Although the closed circuit pattern 24 in FIG. 15 has a form in which both end portions are not connected, the closed circuit pattern 24 may have a form in which both of the end portions are connected, that is, may be a ring-shaped pattern. Alternatively, the closed circuit pattern 25 may be a straight-line pattern that is divided at the sides of the edge portions of the through region 231.

Therefore, the closed circuit pattern 24 can increase the strength of the second substrate portion 23 whose strength is reduced when the through region 231 is provided.

In the embodiment, as shown in FIGS. 13 and 14, the lower damper members D1 and D2 are disposed in the internal space 32 of the coil 3. The lower damper members D1 and D2 are disposed on respective ends of the internal space 32 in the longitudinal direction. The lower damper members D1 and D2 are fixed to an upper surface of the base plate 1 that is exposed at an upper side thereof by the through region 231. That is, the lower damper members D1 and D2 are disposed on the inner peripheral side of the coil 3.

During ordinary vibration of the vibrating body 10, a lower surface of the vibrating body 10 does not contact the lower damper members D1 and D2. When, for example, the vibration motor 15 is accidentally dropped, the vibrating body 10 moves downward and contacts the lower damper members D1 and D2. Therefore, it is possible to prevent the vibration motor 10 from moving excessively downward. This makes it possible to suppress, for example, excessive deformation of the elastic member 11. The lower damper members may be disposed on the upper surface of the substrate instead of on the base plate.

Next, a more specific structure of the base plate 1 is described. As shown in FIGS. 14 and 15, a region of the base plate 1 within the through region 231 has two hole portions 1A and 1B having different shapes and extending therethrough in the up-down direction. The hole portions 1A and 1B are disposed in the longitudinal direction.

Figure 16:
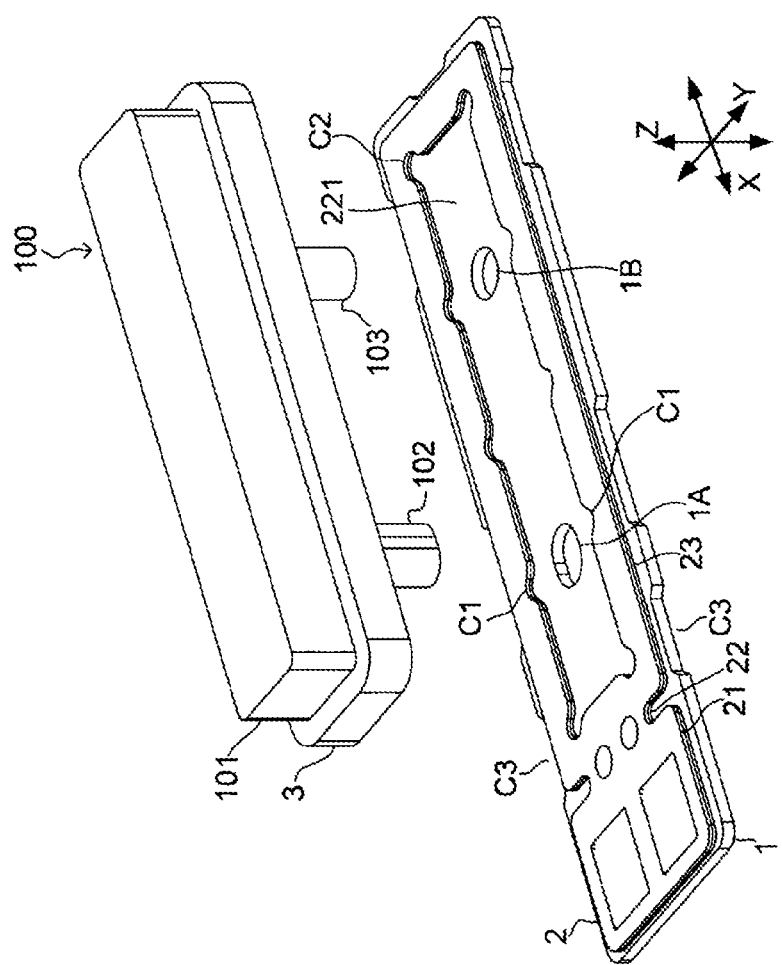
FIG. 16 is a perspective view for describing fixing of the coil by using a jig.
Figure 17:
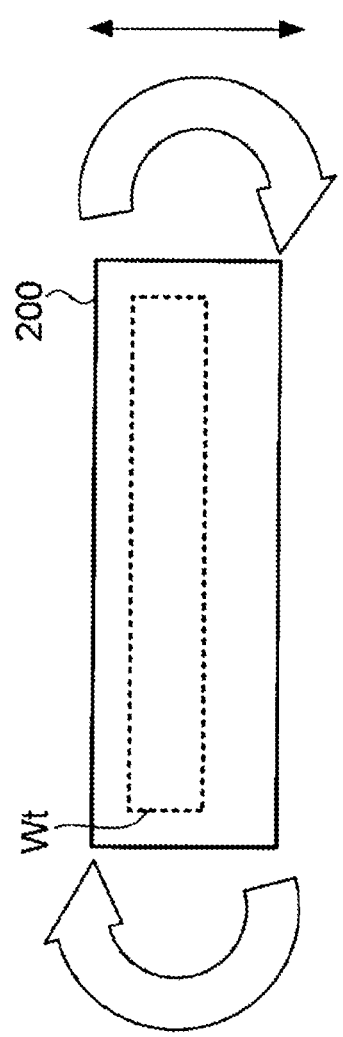
FIG. 17 is a schematic view illustrating a wavy motion of the vibrating body.

The hole portions 1A and 1B are used in fixing the coil 3 to the substrate 2. As shown in FIG. 16, in fixing the coil 3 to the substrate 2, a jig (bobbin) 100 is used. The jig 100 includes a base section 101, and bosses 102 and 103 that protrude downward from the base section 101. The boss 102 has a sectional shape that corresponds to the shape of the hole portion 1A. The boss 103 has a sectional shape that corresponds to the shape of the hole portion 1B.

The boss 102 of the jig 100 around whose base section 101 the coil 3 is wound is passed through the hole portion 1A and the boss 103 thereof is passed through the hole portion 1B, so that the coil 3 is disposed on the substrate 2. At this time, as mentioned above, an adhesive is applied to the cutout portions C1 and C2 of the substrate 2, so that the coil 3 is fixed to the base plate 1. Thereafter, the jig 100 is removed from the coil 3.

Since the hole portions 1A and 1B have different shapes, in fixing the coil 3, the jig 100 can be easily faced with respect to the hole portions 1A and 1B.

As shown in FIG. 15, each cutout recessed portion C3 is provided in a corresponding one of side portions of the base plate 1 that oppose each other in the lateral direction. In the example in FIG. 15, each side portion has three cutout recessed portions C3 that are provided side by side in the longitudinal direction.

On the other hand, as shown in FIG. 1, the case 4 includes side surface portions 42 that oppose each other in the lateral direction. Each side surface portion 42 has three protruding portions 4A that protrude downward and that are provided side by side in the longitudinal direction.

The protruding portions 4A are fitted into the corresponding cutout recessed portions C3. That is, the cutout recessed portions C3 are each provided in a corresponding one of the side portions of the base plate 1 that oppose each other in the lateral direction; the case 4 includes the side surface portions 42 that oppose each other in the lateral direction; and the side surface portions 42 include the protruding portions 4A that protrude downward, and the protruding portions 4A are fitted to the cutout recessed portions C3. Therefore, the case 4 is easily positioned when fixing the case 4 to the base plate 1.

Others

Although an embodiment of the present invention is described, the embodiment may be variously modified within the scope of the gist of the present invention.

For example, the damper member is not limited to a ring-shaped damper member, and may be two rod-shaped members that extend in the longitudinal direction. That is, the damper member may only include portions corresponding to the first longitudinal portion 12A and the second longitudinal portion 12B described above.

The weight of the vibrating body is not limited to a parallelepiped weight, and may be an elliptical weight having a major axis in the longitudinal direction and a minor axis in the lateral direction in top view.

The present invention is usable in, for example, vibration motors installed in, for example, a smartphone or a wearable device.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A vibration motor comprising:
  a stationary portion that includes a base plate, a substrate, a coil, and a case;
  a vibrating body that includes a magnet, a back yoke, and a weight, and that is supported so that the vibrating body is capable of vibrating in an up-down direction with respect to the stationary portion;
  an elastic member; and
  a damper member,
  wherein the substrate is disposed on the base plate,
  wherein the coil is disposed on the substrate,
  wherein the magnet is disposed so that the magnet is capable of being accommodated at an inner peripheral side of the coil due to vibration, the coil being ring-shaped,
  wherein the back yoke is disposed on the magnet,
  wherein the weight is disposed on the back yoke,
  wherein the case accommodates the coil, the magnet, the back yoke, and the weight, wherein the elastic member is disposed between the case and the weight, wherein, in plan view in the up-down direction, the weight extends in a longitudinal direction orthogonal to the up-down direction, wherein a direction that is orthogonal to the up-down direction and the longitudinal direction is a lateral direction of the weight, wherein the elastic member includes
- a first extending portion that extends in the longitudinal direction,
- a second extending portion that extends in the longitudinal direction,
- a first connection portion that connects a first end portion of the first extending portion and a first end portion of the second extending portion,
- a second connection portion that connects a second end portion of the first extending portion and a second end portion of the second extending portion,
- a third extending portion that extends in the longitudinal direction and that opposes the first extending portion in the lateral direction,
- a fourth extending portion that extends in the longitudinal direction,
- a third connection portion that connects a first end portion of the third extending portion and a first end portion of the fourth extending portion,
- a fourth connection portion that connects a second end portion of the third extending portion and a second end portion of the fourth extending portion, and
- a fifth connection portion that connects in the lateral direction an inner portion of the first extending portion in the longitudinal direction and an inner portion of the third extending portion in the longitudinal direction, wherein the first extending portion is inclined upward from an inner side thereof in the longitudinal direction towards both of the end portions thereof, wherein the second extending portion is inclined upward from both of the end portions thereof towards an inner side thereof in the longitudinal direction, wherein the third extending portion is inclined upward from an inner side thereof in the longitudinal direction towards both of the end portions thereof, wherein the fourth extending portion is inclined upward from both of the end portions thereof towards an inner side thereof in the longitudinal direction, wherein the second extending portion includes a first fixing portion at an uppermost portion of an inclination thereof, wherein the fourth extending portion includes a second fixing portion at an uppermost portion of an inclination thereof, wherein the fifth connection portion is fixed to an upper surface of the weight, wherein the first fixing portion and the second fixing portion are fixed to the case, wherein the damper member is fixed to the upper surface of the weight, wherein the damper member includes
- a first longitudinal portion that, in the plan view in the up-down direction, extends in the longitudinal direction so as to overlap a region that extends from a location at the second extending portion on a first side of the first fixing portion in the longitudinal direction to the first fixing portion and to a location at the second extending portion on a second side of the first fixing portion in the longitudinal direction, and
- a second longitudinal portion that, in the plan view in the up-down direction, extends in the longitudinal direction so as to overlap a region that extends from a location at the fourth extending portion on a first side of the second fixing portion in the longitudinal direction to the second fixing portion and to a location at the fourth extending portion on a second side of the second fixing portion in the longitudinal direction, and wherein an inner section including the first extending portion, the third extending portion, and the fifth connection portion directly opposes the upper surface of the weight in the plan view in the up-down direction.

2. The vibration motor according to claim 1, wherein the first longitudinal portion overlaps the second extending portion in an entirety thereof in the plan view in the up-down direction, and wherein the second longitudinal portion overlaps the fourth extending portion in an entirety thereof in the plan view in the up-down direction.

3. The vibration motor according to claim 1, wherein the damper member is ring-shaped.

4. The vibration motor according to claim 3, wherein the damper member is formed from one member.

5. The vibration motor according to claim 4, wherein widths of the first to fourth connection portions are larger than widths of the first to fourth extending portions.

6. The vibration motor according to claim 1, wherein widths of the first to fourth connection portions are larger than widths of the first to fourth extending portions.

7. The vibration motor according to claim 1, wherein the back yoke includes a rectangular top surface portion and long-side protruding portions, the top surface portion including long-side portions in the longitudinal direction and short-side portions in the lateral direction, the long-side protruding portions protruding downward from the long-side portions of the top surface portion, and wherein the back yoke does not include short-side protruding portions that protrude downward from the short-side portions of the top surface portion.

8. The vibration motor according to claim 7, wherein a surface of the back yoke to which the magnet is fixed has a through hole that extends therethrough in the up-down direction.

9. The vibration motor according to claim 7, further comprising a lower damper member at the inner peripheral side of the coil.

10. The vibration motor according to claim 7, wherein the substrate has a through region that extends in the up-down direction therethrough at the inner peripheral side of the coil, and wherein edge portions of the through region have a plurality of cutout portions.

11. The vibration motor according to claim 10, wherein a closed circuit pattern is provided along a periphery of the through region.

12. The vibration motor according to claim 11, wherein a region of the base plate within the through region has two hole portions having different shapes and extending therethrough in the up-down direction.

13. The vibration motor according to claim 10, wherein a region of the base plate within the through region has two hole portions having different shapes and extending therethrough in the up-down direction.

14. The vibration motor according to claim 7, wherein the base plate includes side portions that oppose each other in the lateral direction, each side portion having a cutout recessed portion,
- wherein the case includes side surface portions that oppose each other in the lateral direction,
- wherein each side surface portion has a protruding portion that protrudes downward, and
- wherein each protruding portion is fitted to a corresponding one of the cutout recessed portions.

15. A vibration motor comprising:
- a stationary portion that includes a base plate, a substrate, a coil, and a case;
- a vibrating body that includes a magnet, a back yoke and a weight, and that is supported so that the vibrating body is capable of vibrating in an up-down direction with respect to the stationary portion;
- an elastic member; and
- a damper member,
- wherein the substrate is disposed on the base plate,
- wherein the coil is disposed on the substrate,
- wherein the magnet is disposed so that the magnet is capable of being accommodated at an inner peripheral side of the coil due to vibration, the coil being ring-shaped,
- wherein the back yoke is disposed on the magnet,
- wherein the weight is disposed on the back yoke,
- wherein the case accommodates the coil, the magnet, the back yoke, and the weight,
- wherein the elastic member is disposed between the case and the weight,
- wherein, in plan view in the up-down direction, the weight extends in a longitudinal direction orthogonal to the up-down direction,
- wherein a direction that is orthogonal to the up-down direction and the longitudinal direction is a lateral direction of the weight,
- wherein the elastic member includes
    - a first extending portion that extends in the longitudinal direction,
    - a second extending portion that extends in the longitudinal direction,
    - a first connection portion that connects a first end portion of the first extending portion and a first end portion of the second extending portion,
    - a second connection portion that connects a second end portion of the first extending portion and a second end portion of the second extending portion,
    - a third extending portion that extends in the longitudinal direction and that opposes the first extending portion in the lateral direction,
    - a fourth extending portion that extends in the longitudinal direction,
    - a third connection portion that connects a first end portion of the third extending portion and a first end portion of the fourth extending portion,
    - a fourth connection portion that connects a second end portion of the third extending portion and a second end portion of the fourth extending portion, and
    - a fifth connection portion that connects in the lateral direction an inner portion of the first extending portion in the longitudinal direction and an inner portion of the third extending portion in the longitudinal direction,
- wherein the first extending portion is inclined downward from an inner side thereof in the longitudinal direction towards both of the end portions thereof,
- wherein the second extending portion is inclined downward from both of the end portions thereof towards an inner side thereof in the longitudinal direction,
- wherein the third extending portion is inclined downward from an inner side thereof in the longitudinal direction towards both of the end portions thereof,
- wherein the fourth extending portion is inclined downward from both of the end portions thereof towards an inner side thereof in the longitudinal direction,
- wherein the second extending portion includes a first fixing portion at a lowermost portion of an inclination thereof,
- wherein the fourth extending portion includes a second fixing portion at a lowermost portion of an inclination thereof,
- wherein the fifth connection portion is fixed to the case,
- wherein the first fixing portion and the second fixing portion are fixed to an upper surface of the weight,
- wherein the damper member is fixed to the case,
- wherein the damper member includes
    - a first longitudinal portion that, in the plan view in the up-down direction, extends in the longitudinal direction so as to overlap a region that extends from a location at the second extending portion on a first side of the first fixing portion in the longitudinal direction to the first fixing portion and to a location at the second extending portion on a second side of the first fixing portion in the longitudinal direction, and
    - a second longitudinal portion that, in the plan view in the up-down direction, extends in the longitudinal direction so as to overlap a region that extends from a location at the fourth extending portion on a first side of the second fixing portion in the longitudinal direction to the second fixing portion and to a location at the fourth extending portion on a second side of the second fixing portion in the longitudinal direction, and
- wherein an inner section including the first extending portion, the third extending portion, and the fifth connection portion directly opposes the case in the plan view in the up-down direction.

16. The vibration motor according to claim 15, wherein the first longitudinal portion overlaps the second extending portion in an entirety thereof in the plan view in the up-down direction, and
- wherein the second longitudinal portion overlaps the fourth extending portion in an entirety thereof in the plan view in the up-down direction.

17. The vibration motor according to claim 15, wherein the damper member is ring-shaped.

18. The vibration motor according to claim 15, wherein widths of the first to fourth connection portions are larger than widths of the first to fourth extending portions.

19. The vibration motor according to claim 17, wherein the damper member is formed from one member.

20. The vibration motor according to claim 19, wherein widths of the first to fourth connection portions are larger than widths of the first to fourth extending portions.

* * * * *